Aug. 11, 1942.  W. G. STEVENS, JR  2,292,488
AGRICULTURAL IMPLEMENT
Filed June 16, 1941  2 Sheets-Sheet 2
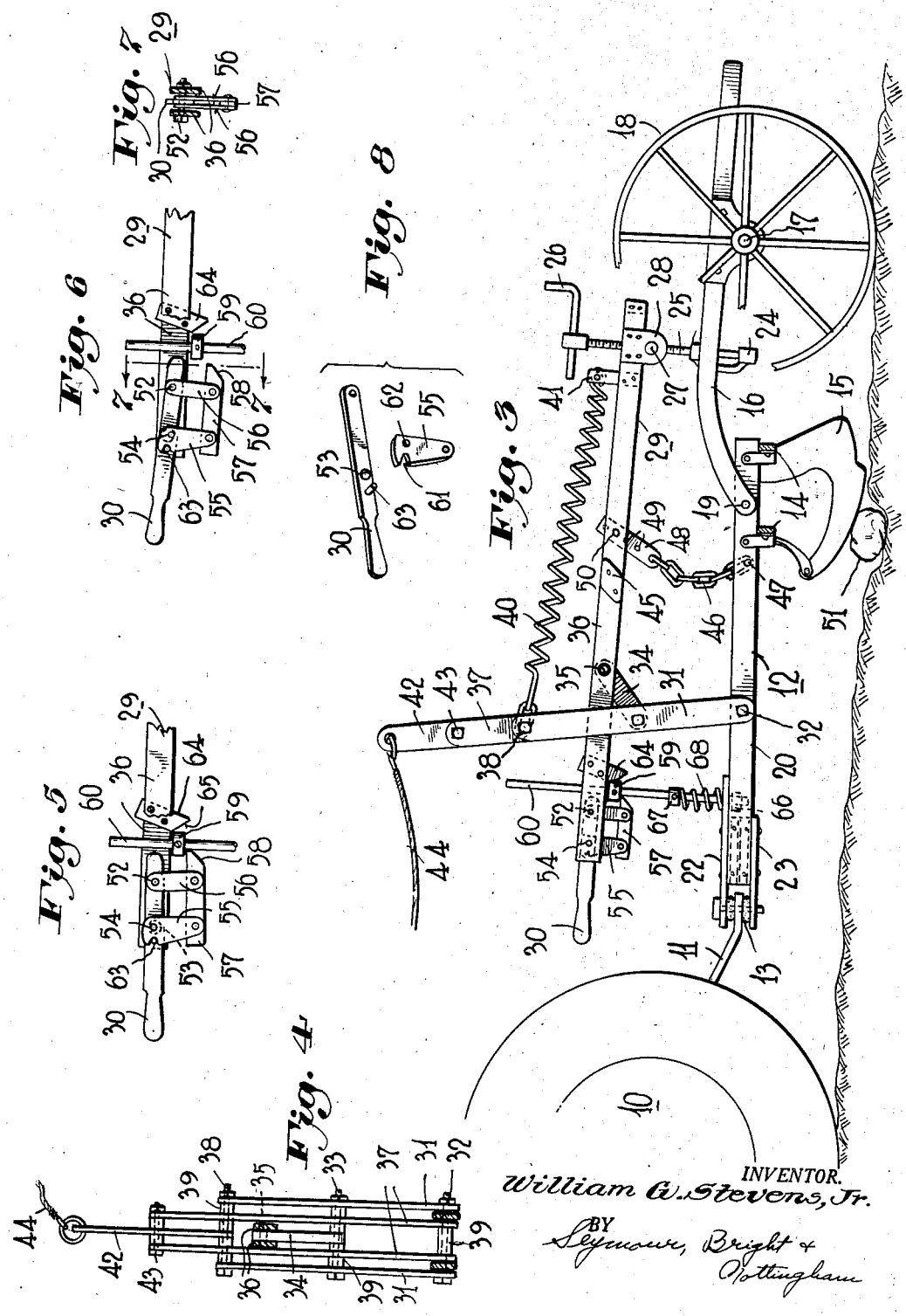
INVENTOR.
William G. Stevens, Jr.
BY
Seymour, Bright &
Nottingham Patented Aug. 11, 1942

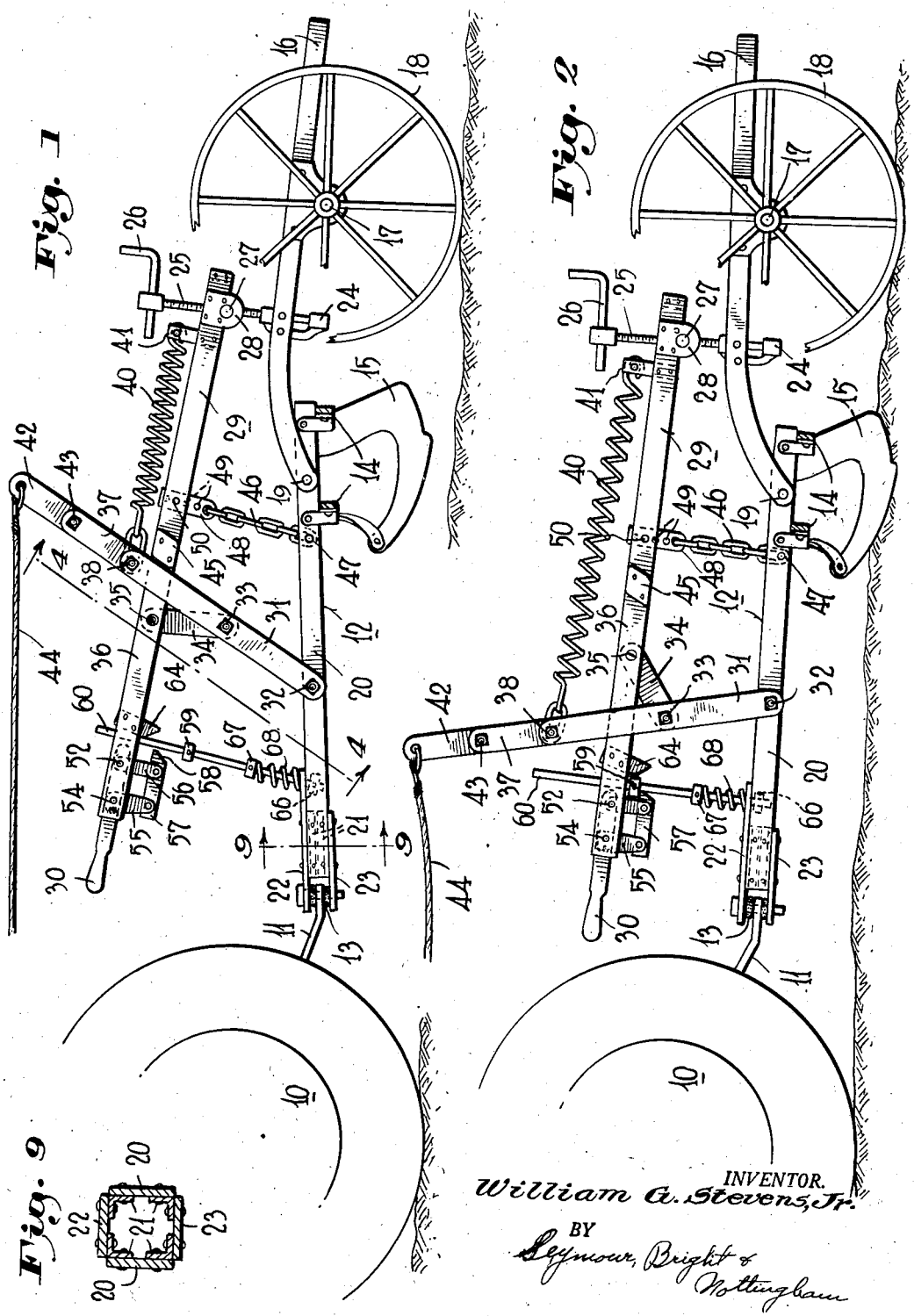

2,292,488

UNITED STATES PATENT OFFICE 2,292,488

AGRICULTURAL IMPLEMENT

William G. Stevens, Jr., Sykesville, Md.

Application June 16, 1941, Serial No. 398,322

14 Claims. (Cl. 97—236)

This invention relates to improvements in agricultural implements, and more particularly to corn planters.

The primary object of the invention is to supply an improved mechanism to enable the driver of a tractor to raise or lower the runners or ground working tools of a towed corn planter or the like, and the present invention is directed specifically to improving the mechanism disclosed in my patents, Nos. 2,128,860, dated Aug. 30, 1938 and 2,170,490, dated Aug. 22, 1939.

Another and important object of the invention is to provide novel means in mechanism of the character disclosed in my patents, to allow the ground working tools or runners to pass over obstacles on the ground, such as rocks, logs, stumps or the like, without liability of injuring any part of the planter or other towed implement.

It is well known that conventional corn planters towed by tractors have means tending to hold the ground engaging tools or runners in forceful contact with the ground, so that when an obstacle is encountered and contact made therewith, either the ground working tools or other parts of the implement are damaged or broken. In accordance with the present invention, the ground working tool means are allowed to "float" so as to follow the contour of the land, and penetration of the soil is obtained merely by the weight of the structure attached to the rear end of the draft member and the ground engaging tools themselves.

Another object is to furnish means whereby the desired results may be accomplished with very little effort on the part of the operator.

A further object is to provide locking means so arranged that the spring force employed in elevating the ground working means or runners is immediately released to assist the operator before any movement of the main lifting lever occurs.

A still further object is to supply a novel arrangement of means for regulating or controlling the depth to which the ground engaging tools penetrate the ground so as to secure a proper working depth while the ground working tools follow the contour of the ground.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 1 is a side elevation, partly broken away and partly in vertical section, of portions of a corn planter provided with my improvements, and shown with its draft member or tongue connected to the rear end portion of a motor driven tractor. In this view, parts unessential to an understanding of theh invention are not illustrated, and the ground working tools of the planter are shown in raised position.

Fig. 2 is a view similar to Fig. 1, with the ground working tools in ground engaging or lowered position.

Fig. 3 is a view similar to Fig. 2, but showing the position of the parts when the ground engaging tools or runners contact an obstacle on the ground.

Fig. 4 is a transverse sectional view of a detail, taken on the line 4—4 of Fig. 1.

Fig. 5 is a side elevation of the front portion of the main lifting lever, partly broken away and showing a latch which I have added to my patented mechanism.

Fig. 6 is a similar view with the latch in unlatched position.

Fig. 7 is a transverse sectional view on the line 7—7 of Fig. 6.

Fig. 8 is an exploded perspective view of details of the latch.

Fig. 9 is a sectional view on the line 9—9 of Fig. 1.

Referring to the drawings, 10 designates the rear end portion of a conventional tractor having a tow-piece 11. A conventional corn planter has a draft member or tongue 12 connected to the tow-piece by a universal joint 13 of any preferred construction.

As is usual, the tongue is rigidly connected to a frame 14 which in turn is rigidly connected to ground working tools or runners 15. The ordinary frame 16 of the corn planter is rockably mounted on the axle 17 supported by the wheels 18, and the forward end of the frame is pivotally connected at 19 to the runner frame or tongue, so that the tongue and runner frame may pivot at 19 about a horizontal axis.

In accordance with the invention, the tongue is preferably formed as indicated in Fig. 9, by a plurality of spaced side bars 20 which are secured by riveted angle irons 21 to an upper plate 22 and a lower plate 23, which may form part of the universal joint.

A main lifting lever 29 is connected to the frame 16 of the corn planter by any suitable means, including a pivotal joint, to allow the forward end of the lever to be raised or lowered. Such means may accord with that disclosed in either one of my above mentioned patents.

As disclosed in my Patent 2,170,490, a bracket 24 is rigidly secured to the planter frame and forms a swivel support for an upstanding screw 25 which may be turned by means of a handle 26 arranged at the top thereof. The screw cooperates with a nut (not shown), having pintles 27 rockably mounted in ears 28 at the rear end of the main lifting lever 29. By turning the handle 26, the depth to which the ground working tools 15 penetrate the soil may be regulated.

The main lifting lever extends from the planter frame forwardly directly above the tongue 12, and terminates at its forward end in a handle or operating member 30 within reach of the driver of the tractor, so that he may readily raise the ground working tools whenever necessary or desirable.

In accordance with my prior inventions, the work of the operator is assisted by a spring and toggle mechanism, and as illustrated in the drawings of the present application, relatively long toggle links 31 have their lower ends pivotally connected at 32 to the tongue, and the upper ends of such links extend above the lever 29. The medial portions of such links are pivotally connected at 33 to the lower end of a shorter toggle link 34 pivotally connected at 35 to the medial portion of the lever 29.

As best shown in Fig. 4, for constructional purposes, the links 31 are arranged at opposite sides of the tongue 12 and lever 29, and the lever is constituted by parallel bars 36 between which the upper end of the toggle link 34 extends. An inner pair of links 37 of greater length than the links 31 are fixed to the latter by means of the pins 32, 33 and 38, and it may be seen from Fig. 4 that all of these pins may be in the form of bolts on which suitable spacing elements 39 are arranged.

The lifting spring 40 in this example of the invention, may have its rear end secured to a bracket 41 arranged adjacent to the screw 25, and its forward end secured to the pin 38 at the upper ends of the links 31.

Referring again to Fig. 4, it will be noted that an arm 42 is arranged parallel to the links 31 and 37, and extends above the links 37. The arm is rigidly secured to such links by the bolts or pins 38 and 43, the latter passing through the upper ends of the links 37 and the medial portion of the arm.

Any suitable form of operating element extends from the upper end of the arm 42 to a position within reach of the driver of the tractor, so that he may move the arm forward when desired. For example, such operating means may consist of a rope 44 having its rear end connected to the upper end of the arm 42.

As shown in Fig. 1, when the lever 29 is in raised position and the ground working tools are elevated, the spring 40 will hold the upper end portions of the links 31 in contact with rear stops 45, rigid with the lever 29.

In order that the raising of the forward end of the lever 29 will cause lifting of the frame of the ground working tools, suitable means are provided to connect the parts 12 and 29. In accordance with the present invention, such connection is in the form of a flexible element such as a chain 46 having its lower end secured to the tongue or runner frame by any suitable means such as a pin 47. The upper end of the chain is secured to a plate 48 having a number of holes 49, any one of which may receive a pin 50 which engages the lever 29 to adjustably secure the plate to a lever. This construction provides not alone a flexible connection to allow either one of the ground working tools to rise when it strikes an obstacle 51 (Fig. 3), but also permits adjustment of the depth to which such tool or tools penetrate the soil.

Another feature of the invention resides in the means now to be described. From Figs. 5 and 6 it will be noted that the handle 30 is pivotally connected at its rear end by a horizontal pin 52 to the forward end portions of the bars 36 of the lever 29, and the medial portion of the handle is provided with an enlarged hole 53 (Fig. 8), to receive a relatively slender pin 54 connecting the forward ends of the bars 36. This allows the forward end of the handle to be raised and lowered slightly relatively to the forward ends of the bars 36. A pair of links 55, 56 pivotally depend from the pins 52 and 54, and they pivotally support a latch bar 57 having a nose 58 that is inclined upwardly and rearwardly so as to cooperate with an abutment 59 adjustably secured to an upstanding rod 60. As best shown in Fig. 8, the link 55 has a notch 61 offset from the hole 62 which receives the pin 54, and designed to engage a laterally extending finger 63 on the handle, positioned immediately forward of the hole 53. Due to this construction, it will be understood that when the handle 30 is turned upwardly on the pin 52, the finger 63 will cause the link 55 to turn in a clockwise direction about the pin 54, so as to withdraw the bar 57 from a position beneath the abutment 59. On the other hand, if the forward end of lever 29 is moving downwardly, the nose 58 of latch bar 57 will come in contact with the forward side of abutment 59 of rod 60, and immediately afterwards, the nose 65 of cam 64 will come into engagement with the rear side of abutment 59. As lever 29 continues moving downwardly, cam 64 (fixed to the bars 36 of lever 29), will move downwardly and the inclined nose 65 of cam 64 will force the abutment 59 forwardly against the nose 58 of downwardly moving latch bar 57, so that bar 57 will move both forwardly and downwardly. Eventually, latch bar 57 will move down beyond abutment 59, since the links 55 and 56 are of a length to allow such movement. When the top of latch bar 57 moves down beyond the bottom of abutment 59, the latch bar is free to move backwardly. Since notch 61, of link 55 which is attached to the forward end of latch 57, is in engagement with the laterally extending finger 63 on the handle 30, and the weight of handle 30 exerts a downward force on the finger 63, the link 55 will be quickly rotated in a counterclockwise direction and move latch 57 backwardly from the position shown in Fig. 6 to the position shown in Fig. 5. When latch bar 57 is in the position shown in Figs. 2, 3 and 5, the lever 29 is held in this position and cannot be raised until latch bar 57 is moved forwardly to the position shown in Fig. 6 so as to clear the abutment 59.

The rod 60 extends upwardly freely between the bars 36 of the lifting lever, and its lower end portion extends loosely through a hole in the plate 22. Below the plate, a nut 66 is adjustably secured to the rod, and between the plate and an abutment 67 on the rod, a shock absorbing spring 68 is positioned. Rod 60 fits loosely between bars 36, the extreme rear end of handle 30, and the cam 64.

In operation, it will be assumed that the parts are in the positions shown in Fig. 1, with the runners or ground working tools 15 elevated so that the planter may be turned at the end of a row, or may be transported from field to field, or from the field to the barn. In this condition, the spring 40 functions to hold the runners in raised position, and to hold the upper ends of the long toggle links 31 in a position rearwardly of the pivoting point 35. At such time, the latch bar 57 has no function.

When it is desired to lower the ground working tools, the operator pulls forwardly on the cord 44, and this causes the upper ends of the toggle links 31 to move forwardly of the pivot point 35 so that the forward end of the lever 29 will descend. As it moves downwardly, the nose 58 of the latch bar will first engage the abutment 59 so as to automatically retract said bar, and immediately afterwards, the abutment will come into engagement with the nose of the cam 64. When the forward end of the lifting lever has descended a predetermined distance, the abutment 59 will come into engagement with the lower edges of the bars 36 of the lifting lever, and the latch bar will automatically move into latching position, as indicated in Figs. 2, 3 and 5. During such action, the spring 68 will act as a shock absorber. When the latch is in latching position, it will prevent the front end of the lever from accidentally rising under the influence of the spring 40.

After the runners have been moved to lowered position, and the parts are in the position shown in Fig. 2, if one or more of the runners contacts an obstruction 51 while travelling over the field, the runner frame will rise, but this will cause no damage because the chain 46 will be flexed. By way of explanation, it should be noted that the tension of spring 40 is such that when it is fully extended, as shown in Fig. 2, the weight of the planter parts attached to the rear end portion of the draft member or tongue 12 is sufficient to produce a downward force at the point where the lower edges of the bars 36 of the lifting lever 29 contact the top of the abutment 59. The magnitude of this downward force at the point of contact just mentioned will depend on the nature of the soil and condition of the field where the planter is to be operated. Under average conditions, this downward force should be somewhere from 10 to 20 pounds; however, it may vary to suit the operator.

When the ground working tools 15 actually come in contact with an obstruction, such as 51 shown in Fig. 3, the planter parts attached to the rear portion of the draft member or tongue 12 will rise, as the planter moves forwardly and the flexible element 46 will slacken. When the flexible element 46 is slackened (due to the ground working tools or runners riding over an obstruction), the downward force exerted by the weight of the planter parts attached to the rear end portion of the draft member 12 is supported at the points of contact between the ground working tools 15 and the obstruction 51. Since a downward force no longer acts on the pin 50 which engages the lever 29, the full tension force of spring 40 will come into play and be exerted at the upper ends of the toggle links 31 and increase the force acting upwardly on pin 35 so that the lever 29 will have a tendency to move upwardly, and the top of latch bar 57 will come in contact with the bottom of abutment 59. Hence, the ground tools 15 are not in forceful contact with the ground, but free to "float" over the obstruction 51 (see Fig. 3).

When the ground working tools are to be raised, the driver of the tractor reaches downwardly from his seat, and grasps the handle 30. As he lifts the forward end of the latter, he will cause the latch bar 57 to move to unlatched position, so as to clear the abutment 59, and then, the spring 40 will come into play to move the upper ends of the toggle links 31 rearwardly so as to assist in the lifting of the ground working tools. As soon as the upper ends of the toggle links 31 move rearwardly of a line passing through the pivot points 32 and 35, the spring will function to hold the runners 15 in raised position.

While I have disclosed the invention in connection with a corn planter having a conventional runner structure, it will be obvious that my mechanism may be employed with any corn planter having the usual ground working tools, and of course, the mechanism may also be employed with any agricultural implement of the type adapted to be towed by a tractor and having ground working tools which should be raised at the end of each row or for transportation from one place to another.

From the foregoing it is believed that the construction, operation and advantages of the invention may be readily understood by those skilled in the art, and it will be apparent that changes may be made in the details disclosed without departing from the spirit of the invention as expressed in the claims.

What I claim and desire to secure by Letters Patent is:

1. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said ground working tool structure for raising the latter, and means cooperating with the lever for automatically locking said structure in raised position after the front end of said lever has been raised to a predetermined position, the improvement in which said connecting means is of chain-like form to allow the ground working tool structure to rise independently of said lifting lever.

2. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said ground working tool structure for raising the latter, and means cooperating with the lever for automatically locking said structure in raised position after the front end of said lever has been raised to a predetermined position, the improvement in which the connecting means comprises a chain-like element, and means for shortening or lengthening the effective length thereof.

3. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said ground working tool structure for raising the latter, and means cooperating with the lever for automatically locking said structure in raised position after the front end of said lever has been raised to a predetermined position, the improvement in which said connecting means is flexible substantially throughout the length thereof to permit the ground working tool structure to rise independently of the lifting lever and to fall as far as the flexible connecting means will permit.

4. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said ground working tool structure for raising the latter, and means cooperating with the lever for automatically locking said structure in raised position after the front end of said lever has been raised to a predetermined position, the improvement in which said connecting means is flexible substantially throughout the length thereof to permit the ground working tool structure to rise independently of the lifting lever and to fall as far as the flexible connecting means will permit, and means for shortening or lengthening the effective length of said flexible connecting means.

5. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said ground working tool structure for raising the latter, and means cooperating with the lever for automatically locking said structure in raised position after the front end of said lever has been raised to a predetermined position, the improvement in which the connecting means comprises a plate adjustably connected to said lever, and means comprising chain links connecting said bar to the ground working tool structure.

6. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said ground working tool structure for raising the latter, and means cooperating with the lever for automatically locking said structure in raised position after the front end of said lever has been raised to a predetermined position, the improvement comprising means for detachably securing the front end portions of the tongue and lever to one another to prevent accidental upward movement of the lever when the ground working tool structure is in lowered position.

7. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said ground working tool structure for raising the latter, and means cooperating with the lever for automatically locking said structure in raised position after the front end of said lever has been raised to a predetermined position, the improvement comprising means for detachably securing the front end portions of the tongue and lever to one another to prevent accidental upward movement of the lever when the ground working tool structure is in lowered position, the last mentioned means being releasable under the influence of said operating member.

8. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said ground working tool structure for raising the latter, and means cooperating with the lever for automatically locking said structure in raised position after the front end of said lever has been raised to a predetermined position, the improvement comprising a rod connected to the forward end portion of the tongue and extending upwardly into engagement with the forward end portion of the lever, an abutment on the rod, and a latch carried by the lever and engageable with said abutment.

9. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said ground working tool structure for raising the latter, and means cooperating with the lever for automatically locking said structure in raised position after the front end of said lever has been raised to a predetermined position, the improvement comprising a rod connected to the forward end portion of the tongue and extending upwardly into engagement with the forward end portion of the lever, a first abutment on the rod, a shock absorbing element arranged between the abutment and the tongue for cushioning downward movement of the rod, a second abutment on the rod, and latching means carried by the lever and engageable with the second abutment for holding the forward end portion of the lever in its lowermost position.

10. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said ground working tool structure for raising the latter, and means cooperating with the lever for automatically locking said structure in raised position after the front end of said lever has been raised to a predetermined position, the improvement comprising a rod secured to the forward end portion of the tongue and extending upwardly into engagement with the forward end portion of the lever, an abutment on the rod, a latch bar engageable with the abutment for securing the forward end of the lever in lowermost position, and means operatively connecting the latch bar to said operating member whereby the raising of one end of the latter will move the latch bar into retracted position.

11. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever, an upwardly and downwardly adjustable fulcrum member mounted on the main frame and to which the rear end portion of the lever is pivotally connected, said lever extending forwardly above the tongue and having an operating member arranged substantially above the front end of the tongue, connecting means operatively connecting a medial portion of said lever to said structure for raising the latter, and means cooperating with the lever for automatically locking said structure in raised position after the front end of said lever has been raised to a predetermined position, the improvement in which said connecting means includes a flexible element adapted to permit the ground working tool structure to rise independently of the lever and to fall as far as the flexible element will permit.

12. In an agricultural implement of the type comprising a wheel supported axle, a main frame mounted on said axle for movement above a horizontal axis, a ground working tool structure operatively connected to the main frame, a tongue rigidly connected to said structure and projecting forwardly therefrom and adapted to be connected at its forward end to a tractor, a lifting lever, an upwardly and downwardly adjustable fulcrum member mounted on the main frame and to which the rear end portion of the lever is pivotally connected, said lever extending forwardly above the tongue and having an operating member arranged substantially above the front end of the tongue, connecting means operatively connecting a medial portion of said lever to said structure for raising the latter, and means cooperating with the lever for automatically locking said structure in raised position after the front end of said lever has been raised to a predetermined position, the improvement comprising means at the forward end portions of the tongue and lever for preventing the forward end portion of the lever from accidentally rising after it has been moved to lowermost position.

13. In an agricultural implement of the type comprising a wheel supported axle, a main frame mounted on said axle for movement about a horizontal axis, a ground working tool structure operatively connected to the main frame, a tongue rigidly connected to said structure and projecting forwardly therefrom and adapted to be connected at its forward end to a tractor, a lifting lever, an upwardly and downwardly adjustable fulcrum member mounted on the main frame and to which the rear end portion of the lever is pivotally connected, said lever extending forwardly above the tongue and having an operating member arranged substantially above the front end of the tongue, connecting means operatively connecting a medial portion of said lever to said structure for raising the latter, and means cooperating with the lever for automatically locking said structure in raised position after the front end of said lever has been raised to a predetermined position, the improvement in which the connecting means is of chain-like form and means is provided at the forward end portions of the tongue and lever for preventing the forward end portion of the lever from accidentally moving upwardly after it has assumed its lowermost position.

14. In a planter of the type comprising a wheel supported axle, a main frame mounted on said axle for movement about a horizontal axis, a runner structure operatively connected to the main frame, a tongue rigidly connected to said structure and projecting forwardly therefrom from and adapted to be connected at its forward end to a tractor, a lifting lever having its rear end operatively connected to the main frame, said lever extending forwardly above the tongue and having an operating member arranged above the front end portion of the tongue, connecting means operatively connecting a medial portion of said lever to said runner structure for raising the latter, and means cooperating with the lever for automatically holding said structure in raised position after the front end of said lever has been raised to a predetermined position, the improvement in which the connecting means is flexible substantially throughout the length thereof to allow the runner structure to rise and fall independently of the lifting lever.

WILLIAM G. STEVENS, Jr.